(12) United States Patent
Ohara et al.

(10) Patent No.: US 6,356,626 B1
(45) Date of Patent: Mar. 12, 2002

(54) POINT TO POINT VOICE MESSAGE PROCESSOR, METHOD AND RECORDING/PLAYBACK DEVICE

(75) Inventors: Yasuyuki Ohara; Toshihiko Sakai, both of Aichi (JP); Geoffrey S. Stern, Westport, CT (US)

(73) Assignee: Voice Express Corporation, Tuckahoe, NY (US)

( * ) Notice: Subject to any disclaimer, the term of this patent is extended or adjusted under 35 U.S.C. 154(b) by 0 days.

(21) Appl. No.: 09/364,917

(22) Filed: Jul. 19, 1999

Related U.S. Application Data

(63) Continuation of application No. PCT/JP97/04464, filed on Dec. 5, 1997.

(51) Int. Cl.[7] .................................................. H04M 1/64
(52) U.S. Cl. .................. 379/88.22; 379/67.1; 379/88.28
(58) Field of Search ............................. 379/68, 70, 73, 379/74, 87, 88.18, 88.22, 88.23, 88.24, 88.25, 88.26, 88.27, 88.28, 67.1; 369/25, 29

(56) References Cited

U.S. PATENT DOCUMENTS

| | | | |
|---|---|---|---|
| 4,969,136 A | * | 11/1990 | Chamberlin et al. .......... 369/29 |
| 5,172,404 A | * | 12/1992 | Hashimoto ............... 379/88.18 |
| 5,444,767 A | * | 8/1995 | Goetcheus et al. ........ 379/67.1 |
| 5,648,760 A | * | 7/1997 | Kumar .................. 340/825.25 |
| 5,708,627 A | * | 1/1998 | Gormley ...................... 368/10 |

FOREIGN PATENT DOCUMENTS

WO    WO-99/30472 A1 *  6/1999   ............ H04M/1/65

* cited by examiner

*Primary Examiner*—Fan Tsang
*Assistant Examiner*—Roland G. Foster
(74) *Attorney, Agent, or Firm*—Darby & Darby

(57) ABSTRACT

A voice message processor is disclosed for producing remote voice recordings in a decentralized, non-networked environment. Connections are provided for a communication link capable of transmitting and receiving calls over a public communication network, for a telephone set, and for a recordable voice message recording/playback device. A switching device provides a first state in which the telephone set connection and communication link connection are connected together, a second state in which the voice message recording/playback device input is connected to the communication link connection, and a third state in which the voice message recording/playback device output is connected to the communication link connection. A controller enable the voice message recording/playback device to be selectively recorded and played back when the switching device is in its second state and enables the voice message recording/playback device to be selectively played back when the switching device is in its third state.

19 Claims, 13 Drawing Sheets

POINT TO POINT VOICE MESSAGE PROCESSOR, METHOD AND RECORDING/PLAYBACK DEVICE

This is a continuation of international application Serial No. PCT/JP97/04464, filed Dec. 5, 1997.

FIELD OF THE INVENTION

The present invention relates generally to personalized voice message recording/playback devices for use in association with gifts and greeting cards to selectively deliver a personalized voice recording from the gift giver and, more particularly, concerns a method and apparatus for producing the voice recording in a decentralized and non-networked environment.

BACKGROUND OF THE INVENTION

U.S. Pat. No. 5,063,698 to Johnson, et al. discloses a greeting card with an electronic sound recording that embodies a personalized message for the recipient of the card, including a method whereby the message received via telephone from a sender at a remote location is recorded onto an answering machine at a central location, where it is converted into an electronic signal and programmed onto an integrated circuit. The system disclosed in the Johnson et al. patent requires the voice message to be recorded on the memory chip at the location of the answering machine. Such a solution may be adequate for use at the point of purchase where the card is sold for local delivery, however, if as is many times the case, the intended recipient of the card is remotely located from the point of purchase, then the solution offered by Johnson et al. is inadequate.

Stern U.S. Pat. No. 5,425,078 discloses a system for producing voice message recording/playback devices which includes a central message processor which may be accessed from a plurality of communication links such as telephone lines. A customer records a message using a conventional telephone set and a fulfillment site or delivery outlet retrieves the message remotely and records it onto a memory chip, using a subscriber set. When accessed by a customer's set, the central processor permits the caller to create a temporary mailbox associated with the gift purchase, in which he/she may then record a voice message. When called by a subscriber set, the central processor permits previously created mailboxes to be accessed and will transfer the message recorded therein to the subscriber set, where it stored in the integrated circuit contained in the voice message recording/playback device.

Such a solution may be adequate for use by a mail-order catalog which has a single fulfillment and distribution center from which all orders are shipped or a number of fulfillment and distribution centers which are networked together. Similarly, such a solution would be adequate for a floral wireservice, Co-op or other association of retail outlets which form a delivery network from which orders placed within the closed network are fulfilled. In an association where each member is connected to the others through a centralized computer and/or telecommunication network it would be possible and even desirable to have all voice messages stored on a centralized message processor and stored under a temporary mailbox which has a dynamically generated and/or serialized transaction ID associated with a particular gift purchase. Similarly, for a mail-order catalog where orders are taken and entered on a central computer network it would be possible and desirable to associate a temporary mailbox with a dynamically generated order number for a gift purchase.

In a networked environment, there would never be a concern that two independent retailers might generate the same transaction ID with which a temporary mailbox would be associated causing the message of one customer to be delivered in place of another customer.

For a centralized mail-order catalog or for a networked association of retailers, it would be possible and even desirable to have the fulfillment site call the centralized message processor to access the previously recorded voice message. In such a networked environment where the outlets are connected by a computer and/or communications network, it would be possible to identify automatically which outlet is closest to the point of delivery and so instruct that outlet to connect to the message processor, access the temporary mail box and transfer the message onto a voice message recording/playback device. Similarly, a mail-order catalog having one distribution and fulfillment center would have no difficulty in generating a schedule of temporary mail box numbers which needed to be accessed in order to ship a complete order of gift merchandise and associated voice message recording/playback devices. The system of Stern is effective, primarily as long as there is a computer and/or communication network linking the location which captures the order and generates the transaction ID with the location which accesses the temporary mailbox and transfers the message into the voice message recording/playback device, the Stern patent is preferred.

Similarly, there are many mail-order catalogs which also have retail outlets and many retailers of gift merchandise which take orders both over the phone as well as from walk-in customers. The Johnson and Stern patents address the needs of a telephone customer who wishes to order a voice message recording/playback device, but they do not address the needs of a walk-in customer who wishes to create a voice message recording/playback device in a store environment and have it delivered from another location. In both the Johnson and Stern inventions the walk-in customer would be required to transfer all payment and delivery information to the sales agent in the store, but would then have to either leave the store to call in his/her message, or inconvenience both the store and him/herself to use a telephone in the store.

In practice, the Stern system and method not only require the use of a central voice processor but also require a minimum of three different phone calls to transfer information and the voice message itself: 1) the customer calls to order gift merchandise, 2) the customer must call [or be transferred] to a dedicated line into the central voice processor to record a message, and 3) the point of delivery must use a subscription device to dial into the central voice processor to retrieve the message. Since each phone call uses sophisticated enhanced switching or processing technologies there is a significant expense associated with either purchasing the equipment needed to process the calls or with paying an outside telephone service provider to provide these enhanced services.

If voice message recording/playback devices are to become a standardized and preferred form and method of sentiment expression it becomes necessary to introduce a system and method which permits independent retailers, vendors and service providers to capture orders for voice message recording/playback devices without a precondition that they are to be a member of an association nor a requirement that they are connected to a computer and/or a communications network. Similarly, it would be desirable that any independent distribution and fulfillment center or outlet set up with a voice message recording/playback device fulfillment station and having in inventory voice message recording/playback devices, could be available to receive a voice message for transfer onto a voice message recording/playback device in a commercial environment.

If voice message recording/playback devices are to be made available to customers who sometimes use a phone to order gift merchandise and sometimes visit a local retail outlet, and if voice message recording/playback devices are to be offered by retailers who sell gift merchandise both over the phone and from retail outlets and showrooms, then it becomes necessary to provide a method and system that is equally accessible by phone-in and walk-in customers.

If voice message recording/playback devices are to be made available for same-day delivery and if a customer or retailer wishes to control the selection of the delivering agent and the quality of the goods and services delivered with the voice message recording/playback device it is necessary for a method and system to provide for the real-time transfer of the customer's voice message from the point of sale to the point of delivery without the use of a automated computer network.

In conclusion, if voice message recording/playback devices are to be made available by retailers and delivery services of all sizes and levels of technical sophistication and by independent and even non-networked associations, then a flexible method and system for creating and fulfilling the voice message recording/playback devices must be provided which permits voice message recording/playback devices to be created in a manner that reflects the inconsistent buying habits of the typical consumer and that similarly permits fulfillment to be achieved in a flexible manner which permits the voice message to be forwarded from the point of purchase to the point of delivery (call and forward) or retrieved on demand by the point of delivery (record on-demand).

The solutions offered by Johnson and Stern do not address the needs nor mirror the buying habits of the typical consumer or the complexity of multilevel and multi-channel retailers and independent shops and are therefore inadequate.

Broadly, it is an object of the present invention to provide a method and system for the recording, transfer and downloading of voice messages onto voice message recording/playback devices in real-time and directly between two points without the need to unnecessarily handle and transfer sensitive electronics as in Johnson et. al nor by way of a central processor and centralized order entry system such as Stern.

SUMMARY OF THE INVENTION

It is a purpose of the present invention to provide for a simple and flexible method and system that will permit voice message recording/playback devices to be ordered and recorded during one phone call without the need for expensive switching and voice processing hardware and similarly to provide a flexible system which permits voice message recording/playback devices to be recorded at a point of sale whether that point of sale is accessed by way of a phone call or a personal visit.

It is also a purpose of the present invention to provide a system and method that permits an agent at the point of sale to select independently the point of delivery, instruct personnel at the point of delivery directly and control the time to transfer the voice message from the point of sale to the point of delivery.

It is also a purpose of the present invention to permit the customer to select personally and the sales agent to request personally from the delivery site the maximum recording length of the voice message recording/playback device, the model, package design of the voice message recording/playback device, as well as to select any accessory which the customer wishes to have delivered with it.

The invention provides a low cost and straightforward voice message recording/playback device recording and transmission station which records a customer's voice message whether he/she orders a voice message recording/playback device over the phone or in person. The invention uses the same hardware to record and create a voice message recording/playback device for local delivery or remote delivery. To record a voice message recording/playback device in person, the customer is given a standard voice message recording/playback device with a special attachment which permits the customer to stand at any quiet location in or outside of the store to record a voice message directly into the voice message recording/playback device.

Otherwise, the customer may use a voice message recording/playback device which is operable by the customer for recording directly thereonto without need of a special attachment. Recording a voice message recording/playback device in such a manner directly mirrors the accepted and common practice of providing a customer with a card so that he/she can write a personal message as he/she walks around a store. To record a voice message recording/playback device over the phone, the sales agent simply inserts a blank voice message recording/playback device into the voice message recording/playback device message processor while the customer is on the line. The sales agent instructs the customer to wait for instruction and then to record his/her message. The sales agent switches the voice message recording/playback device point-to-point message processor from 'Telephone' to 'Record' mode. The voice message recording/playback device point-to-point message processor greets the customer and instructs the customer.

A preferred message processor would also permit a spokesperson at the point of sale to record personalized instructions to customers using the language and dialect of the customer and making reference to and promoting the point of sale's name.

It is a feature of the present invention that the voice message recording/playback device point-to-point message processor may be connected to any standard telephone line without the need for a dedicated line.

In accordance with the present invention, a system for producing voice message recording/playback devices includes a voice message recording/playback device point-to-point message processor which may be accessed over a plurality of communication links, such as telephone lines or directly at the point of purchase. The message processor may be so accessed by means of a customer's communication set, such as a conventional telephone set, by means of another voice message recording/playback device point-to-point message processor or directly by a customer at the point of purchase. Depending on the setting of a 'mode' switch the voice message recording/playback device point-to-point message processor will record or transfer a new voice message onto a voice message recording/playback device at the point of purchase or to another voice message recording/playback device point-to-point message processor remotely located at another point of delivery. When accessed by a customer's communication set or directly by a customer at the point of purchase, the message processor permits the customer to record a voice message directly onto a voice message recording/playback device. If the customer desires that his/her voice message recording/playback device should be delivered from the point of purchase, the voice message recording/playback device may be removed from the voice message recording/playback device point-to-point message processor and delivered. If the customer desires that his/her voice message recording/playback device should be delivered from a location other than the point of purchase, the voice message recording/playback device point-to-point message processor permits the voice message recording/playback device created by the customer to function as a temporary storage device for the voice message. Once the 'mode' switch on the voice message recording/playback device point-to-point message processor has been set to 'transfer' and a connection is made with a voice message recording/playback device point-to-point message processor remotely located at the desired point of delivery, and the 'mode' switch on the voice message recording/playback device point-to-point message processor located at the desired point of deliver is set to 'record' then the message stored on the voice message recording/playback device located at the point of sale which functions as a temporary storage device is transferred to a voice message recording/playback device located at the point of delivery.

A voice message recording/playback device in accordance with the present invention includes an integrated circuit which is a single chip voice message system. In the preferred embodiment, this voice message system permits recordation and playback of messages under the power of a battery which is included on the same circuit board as the chip, and a miniature speaker included on the circuit board permits the voice message to be heard. The voice message recording/playback device retains the recorded message in non-volatile form, and the entire voice message recording/playback device is contained in a housing which encloses the circuit board. A pin or edge connector is accessible from the outside of the housing and permits the voice message recording/playback device to be plugged into the point-to-point message processor or alternatively to be plugged into a special direct record microphone attachment which permits a customer at the point of sale to record a message directly into the voice message recording/playback device.

A voice message recording/playback device in accordance with another aspect of the present invention includes a microphone which permits a customer to record a voice message directly onto the playback device without need of a special microphone attachment. The voice message recording/playback device has a connector to be plugged into the point-to-point message processor.

BRIEF DESCRIPTION OF THE DRAWINGS

The foregoing, as well as the other objects, features and advantages of the present invention will be understood more completely from the following detailed description of a presently preferred, but nonetheless illustrative, embodiment, with reference being made to the accompanying drawings in which.

DETAILED DESCRIPTION OF THE PREFERRED EMBODIMENTS

Figure 1:
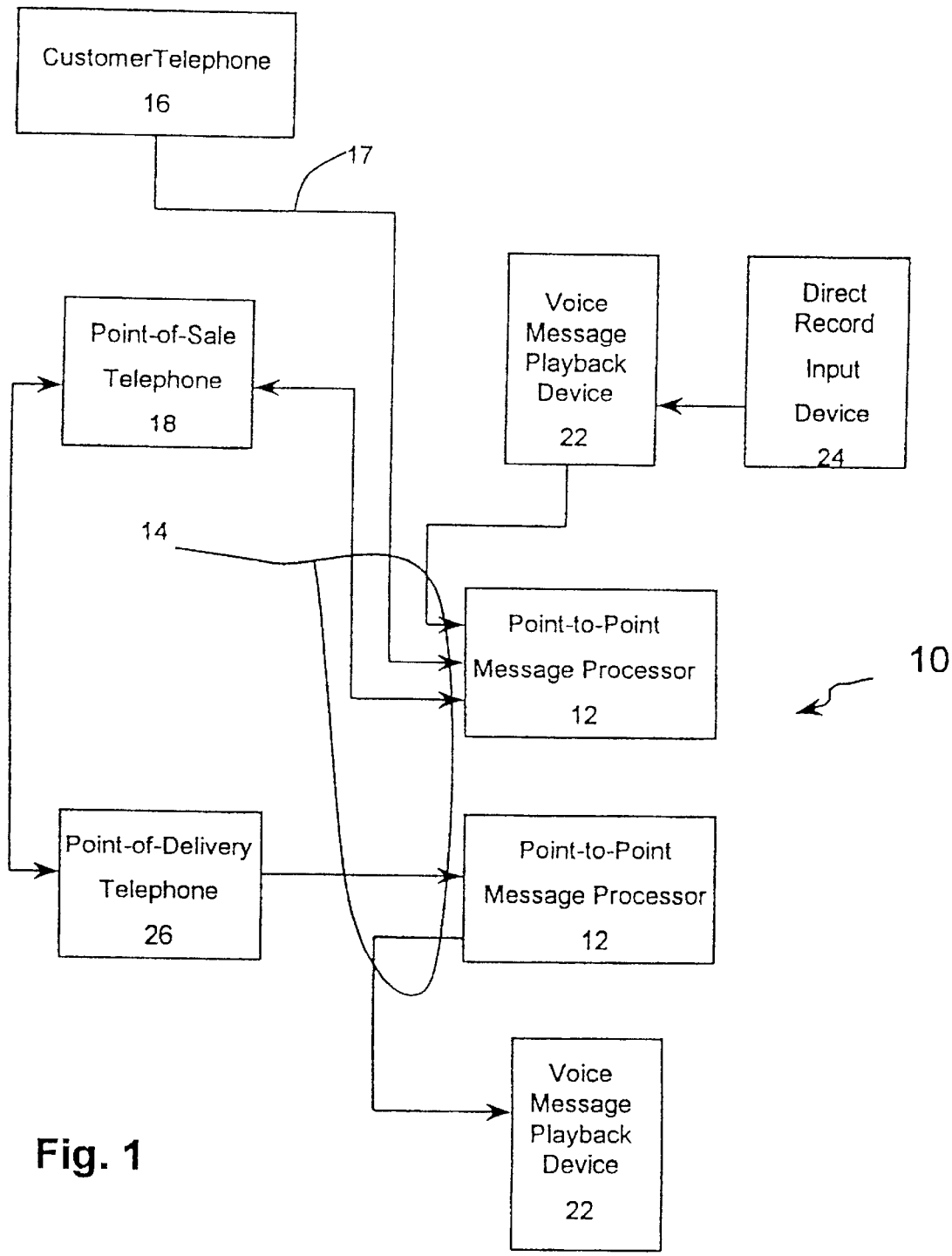
FIG. 1 is a functional block diagram of a point-to-point voice message recording/playback device recording system in accordance with the present invention.

Turning now to the details of the drawing, FIG. 1. is a schematic block diagram illustrating a system 10 incorporating objects and features of the invention. System 10 includes a plurality of point-to-point processors 12 which handle both remote and local connections 14. Each of the connections 14 may be accessed by a conventional touch-tone telephone used by a customer 16 (via a conventional telephone line 17 connected to the public telephone system), sales agent at a point-of-sale 18, a fulfillment agent at a point-of-delivery 26, or by a voice message recording/playback device 22 which is either blank or contains a previously recorded voice message recorded with a special direct input device 24. It is, however, foreseen that system 10 could operate with rotary telephones, as will be described further below.

The remote and local connections 14 are accessed in the manner of a conventional telephone connection or personal visit to a point-of-sale by dialing predefined telephone numbers or by physically visiting a point-of-sale. By means of a choice of a combination of a 'mode' switch settings and connection of a voice message recording/playback device 22 to a function-specific connector on the point-to-point message processor 12, the point-to-point message processor 12 responds with an appropriate response enabling a customer to record a message over the phone 16. Alternatively, a sales agent at a point-of-sale to transfer a message stored on a previously recorded voice message recording/playback device 22 to a blank voice message recording/playback device 22 inserted into a second point-to-point message processor 12 remotely located at a point-of-delivery. The point-to-point message processor 12 will therefore deliver different responses based on the settings of its 'mode' switch and the selection and connection of a voice message recording/playback device to a function-specific connector.

In operation, a customer's telephone call 16, including Internet, Personal Computer Networks, Wide/Local Area Networks etc., might be received via telephone line 17 from customers wishing to record a voice message recording/playback device 22 for either local or remote delivery. Line 17 is connected to telephone 18 through processor 12, permitting the customer's telephone call to be received at phone 18. A blank voice message recording/playback device 22 would be inserted into the 'record' bay on a voice message recording/playback device point-to-point message processor 12. The voice message recording/playback device point-to-point message processor 12 would be connected to the same phone line or phone system as that used by the sales agent to receive customer calls. The sales agent would deliver oral instructions to a first-time customer including instructions to press a designated 'record' key (e.g. the #1 key combination) on the touch-tone phone pad on his/her phone 16 when desiring to record and re-record a message. In addition, the customer would be instructed to wait for a 'beep' tone and then record his/her message. The customer would also be informed as to the maximum recording length of the particular voice message recording/playback Device 22 selected and advised that he/she can either press a second designated key on his/her touch-tone phone pad to 'stop record' (e.g. the #0 key combination) so that the system will play the customer's message or the system will automatically play the customer's message after the maximum recording length has timed-out. Thereafter, the customer could either re-press the designated key on his/her touch-tone phone pad key (e.g. the #1 key) to 'record' another message or wait for the point-of-sale agent to come back online. A repeat customer could forego any instructions from the sales agent.

It should be understood that in a preferred embodiment, the point-to-point message processor 12 could contain a pre-recorded outgoing message (OGM) which would deliver identical instructions to the customer. In such a preferred embodiment, the sales agent would simply advise the customer that he/she is being transferred to the message processor for instructions and to record the customer's personal message.

In order to accommodate rotary phones, the point-to-point message processor 12 could be made responsive to commands pronounced by the customer, as is now conventional in some telephone answering devices (TAD), instead of responding only to tones coded in on the telephone keypad. In such an embodiment the customer would be instructed to press a designated key on his/her touch tone pad or speak the word 'yes' when ready to record a message.

Next the sales agent switches the 'mode' switch on processor 12 from 'Telephone' to 'Record'. Switching the 'mode' switch from 'Telephone' to 'Record' disconnects the sales agent's phone from the line, isolating the customer's line from any background noise at the point of sale, and giving the customer a sense of privacy while he/she records a message. The sales agent can nonetheless monitor the recording session from a built-in speaker on the point-to-point message processor 12 in order to assist the customer, if required, and to terminate the call after the message has been successfully recorded.

The point-to-point message processor 12 sounds a 'beep' to alert the customer, who may then speak his/her message. Once the voice message recording/playback device 22 times out, or if the customer presses a second designated key on his/her touch-tone phone pad to 'stop record' (e.g. the #0 key), the message processor immediately plays back the message so that the customer can review it. The customer may press the designated record key (e.g. the #1 key) on the touch-tone pad on his/her phone to re-record his/her message as many times as necessary until he/she is satisfied with his/her message.

Once the message has been successfully recorded, the sales agent, switches the 'mode' switch on the point-to-point message processor 12 from 'Record' to 'Telephone', thanks the customer and hangs up.

In an alternative operation, a customer present at the point of sale who desires to send a voice message recording/playback device 22 for local or remote delivery would be given a voice message recording/playback device 22 into which would be connected a direct record input device 24. The direct record input device 24 is connected to a connector on the voice message recording/playback device 22 and contains a built-in microphone, a 'Rec' button and a light emitting diode (LED) which stays lit as long as the 'Rec' button is pressed and/or until the record cycle has timed out. The customer located at the point of sale may press the 'Rec' button, to record a message, press the play button to review his/her message and re-record his message as many times as desired until he/she is satisfied with the message. Once satisfied, the customer returns the voice message recording/playback device 22 and the direct record input device 24 to the sales agent.

Once a voice message recording/playback device 22 has been successfully recorded either by a phone customer as in the first operation described above, or by a customer present at the point of sale as in the alternative operation described above, the voice message recording/playback device 22 is removed from the point-to-point message processor 12 (in the case of a phone customer) or disconnected from the direct record input device 24 (in the case of a customer present at the point of sale).

The successfully recorded voice message recording/playback device 22 is now complete for a delivery which is local to the point of sale. If, on the other hand, the customer wishes for the voice message recording/playback device 22 to be delivered from a remote location, the voice message recorded on the voice message recording/playback device 22 must be transferred to another voice message recording/playback device 22 located at a remote point of deliver.

To transfer a voice message from one voice message recording/playback device 22 located at one location, to a voice message recording/playback device 22 located at an other location, the sales agent places a voice message recording/playback device 22 containing the message that is to be transferred, into the 'Transfer' bay on the point-to-point message processor 12 located at the point of sale. The sales agent then dials a point of delivery using his telephone 18. The delivery agent answers his/her phone 26 and is given orally all of the relevant delivery, payment and other customer personal selection information from the sales agent. The sales agent also advises the delivery agent regarding the length of the customer's previously recorded message so that the delivery agent can select a blank voice message recording/playback device 22 with adequate recording capacity from inventory.

The delivery agent inserts an appropriate voice message recording/playback device 22 into the 'Record' bay on the point-to-point message processor 12 located at the delivery point and switches the 'mode' switch on the point-to-point message processor 12 located at the delivery point to 'Record'. The sales agent switches the 'mode' switch on the point-to-point message processor 12 located at the point of sale to 'Transmission' and then presses the 'Transfer' button on the point-to-point message processor 12 located at the point of sale which causes the point-to-point message processor 12 located at the point of sale to emit a DTMF tone which puts the voice message recording/playback device inserted into the 'Transfer' bay on the point-to-point message processor 12 located at the point of sale into play mode and puts the voice message recording/playback device 22 inserted into the 'Record' bay on the point-to-point message processor 12 located at the point of delivery into record mode.

The agents at both the point of sale and point of delivery can monitor the transfer from the built-in speakers contained on their respective point-to-point message processors 12. Once the voice chips on the two voice message recording/playback devices 22 have timed-out and the message has been successfully transferred, the two voice message recording/playback devices 22 may be removed from the respective point-to-point message processors 12. The voice message recording/playback device 22 located at the point of delivery may be delivered to the intended recipient. The voice message recording/playback device 22 located at the point of sale, which functioned as a temporary mail-box, may be re-used to record another customer's voice message.

When the voice message recording/playback device is received by the ultimate recipient, he/she will be able to play the recorded message at will by simply pressing a 'play' button.

Figure 2:
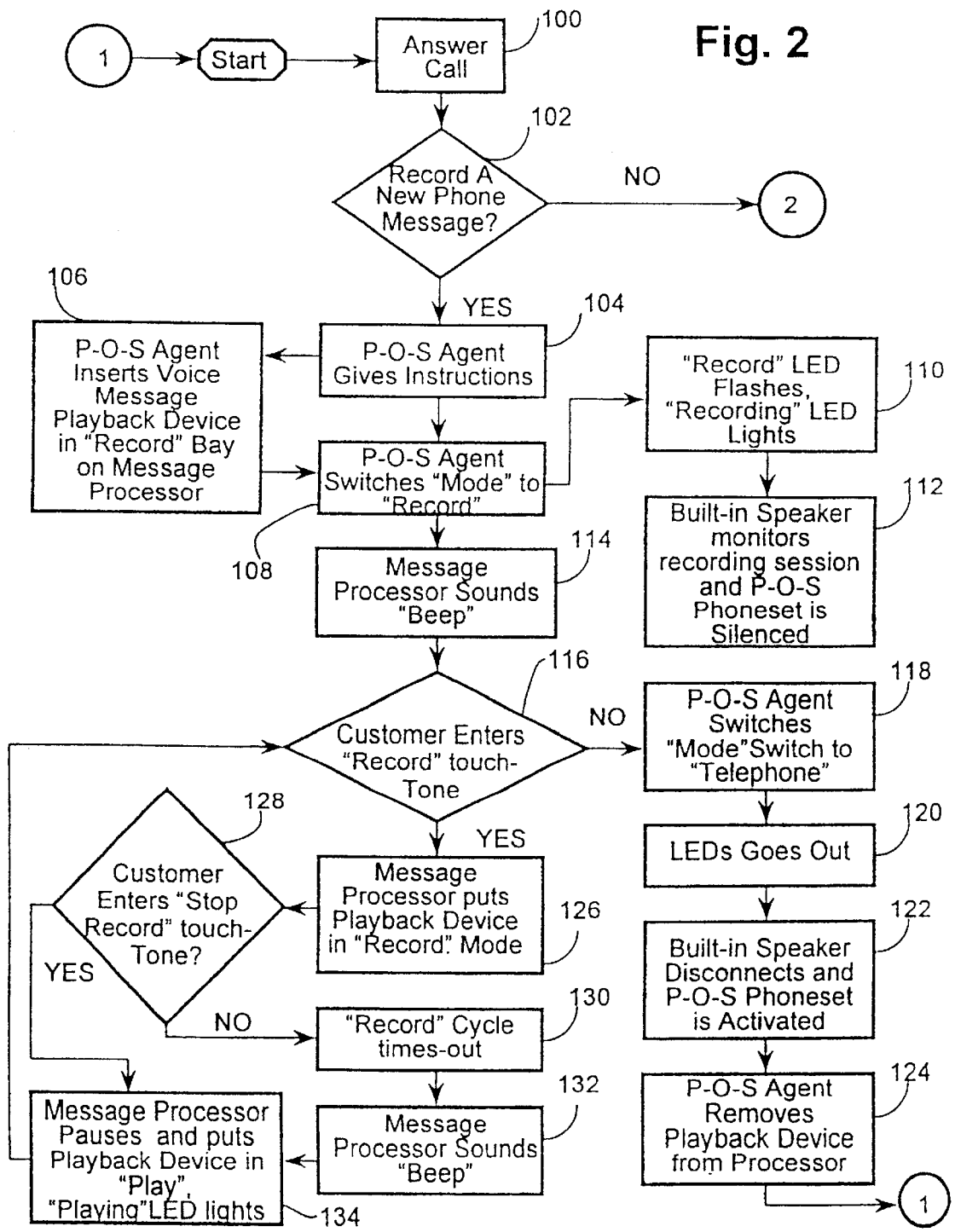
FIGS. 2–4 are flowcharts illustrating how certain processing is performed in the system described in FIG. 1.

FIG. 2 is a illustrating the operation of message processor system 12 in accordance with the present invention when phone customer desires to record a message onto a voice message recording/playback device. The point of sale (P-O-S) agent talks to the customer using his/her telephone 18 at block 100. At block 102 the customer is asked whether he/she wants to record a new voice message or not. If not, the customer is instructed to visit the point of sale and record a voice message in person. If yes, at block 104 the P-O-S agent instructs the customer on how to record a new message using the touch-tone pad on his/her phone to enter commands, and the mouthpiece on his telephone handset to record a message. At block 106 the P-O-S agent inserts a blank voice message recording/playback device 22 into the 'Record' bay of the message processor 12 connected to his/her phone line. At block 108 the P-O-S agent switches the 'mode' switch on the message processor 12 from 'telephone' to 'Record'. At block 110 the 'Record' LED on the message processor 12 begins to flash and the 'Recording' LED lights. At block 112 the built-in speaker on the message processor 12 is activated and the phone set of the P-O-S agent is temporarily disconnected. Simultaneously with block 110, at block 114 a 'beep' tone sounds over the phone line.

At block 116 a determination is made whether the customer entered the 'Record' touch tone. If not, at block 118 the P-O-S agent switches the 'mode' switch back to 'Telephone' at block 118. At block 120 'Record' and 'Recording' LEDs go out. At block 122, the built-in speaker on message processor 12 is disconnected and the P-O-S agent's phone set is reactivated. At block 124 the P-O-S agent removes playback device 22 from message processor 12 and talks to the customer. If the determination at block 116 is positive, then at block 126 message processor 12 puts playback device 22 into 'Record' mode and playback device 22 records the customer's message.

At block 128, it is determined whether the customer either entered a 'Stop Record' touch tone (e.g. the #0 key) if he/she finishes recording message before playback device 22 times-out. If not, at block 130 the 'Record' cycle times-out. At block 132, message processor 12 sounds a 'beep' tone. At block 134, message processor 12 pauses and then puts playback device 22 into 'Play' mode and playback device 22 plays the message for the customer. If at block 128 it is determined that a customer entered a 'Stop Record' touch-tone (e.g. the #0 key), message processor 12 pauses and puts playback device 22 into 'Play' mode and the playback device 22 plays the message for customer at block 134.

The customer decides whether he/she is satisfied with the message. If the customer is not satisfied, he/she presses the 'Record' key and the record sequence repeats starting at block 116. If customer is satisfied, he/she does not press the 'Record' key and the P-O-S agent re-establishes the phone connection at block 118. Termination of the process proceeds through block 120-124, and control returns to the start of the process.

Figure 3:
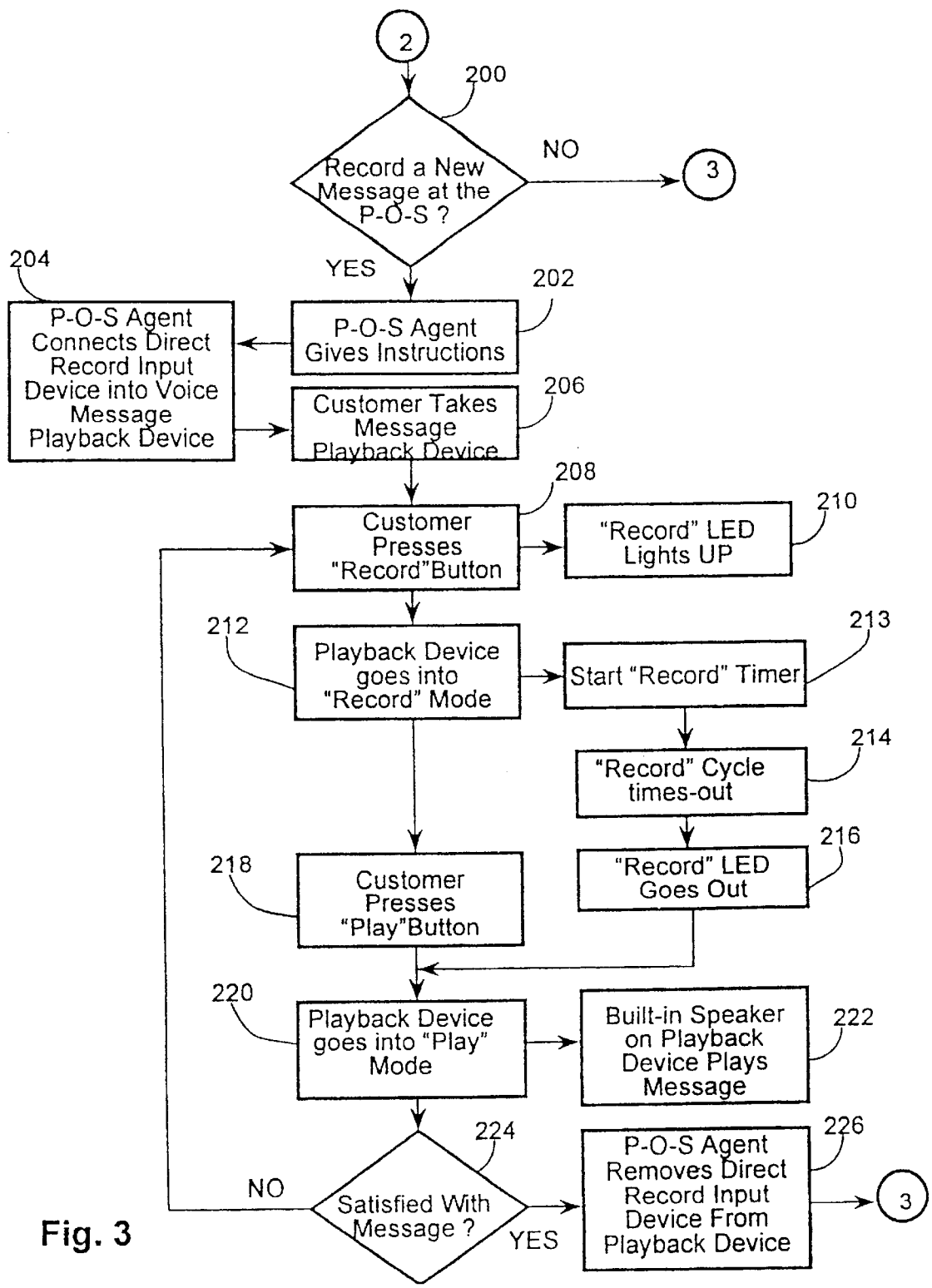

FIG. 3 is a flowchart illustrating the operation of message processor system 12 in accordance with the present invention when a customer present at the point-of-sale desires to record a message directly onto a voice message recording/playback device. The point of sale (P-O-S) agent asks the customer present at the point-of-sale if he/she would like to record a message directly onto a voice message recording/playback device 22 at block 200. If yes, the P-O-S agent instructs the customer at block 202. The P-O-S agent connects a direct record input device 24 into a blank voice message recording/playback device 22 at block 204. The customer takes a voice message recording/playback device 22 which has a direct record input device 24 connected to it, to a quiet area either inside or outside of the P-O-S at block 206.

At block 208, the customer presses the 'Record' button on the direct record input device 24. The 'Record' LED on the direct record input device lights up at block 210. At block 212 the voice message recording/playback device 22 goes into 'Record' mode and records the customer's message. At block 213, the 'Record' cycle timer is started on the voice message recording/playback device 22 and times-out after a predefined interval at block 214. The 'Record' LED on the direct record input device 24 goes out at block 216 and control transfers to block 220. The customer presses the 'Play' button on the voice message recording/playback device 22 at block 218. The voice message recording/playback device 22 goes into 'play' mode at block 220 and plays the message from the built-in speaker at block 222 after the customer is finished recording or as a result of having previously timing-out at block 214.

At block 224, the customer decides whether he/she is satisfied with the message. If the customer is satisfied with the message he/she returns the voice message recording/playback device 22 with the direct record input device 24 attached to it to the P-O-S agent and at block 226 the P-O-S agent removes the direct record input device 24 from the playback device 22. If the customer is not satisfied, he/she presses the 'record' button located on the direct record input device 24 and control transfers to block 208, repeating the 'record' sequence.

Figure 4:
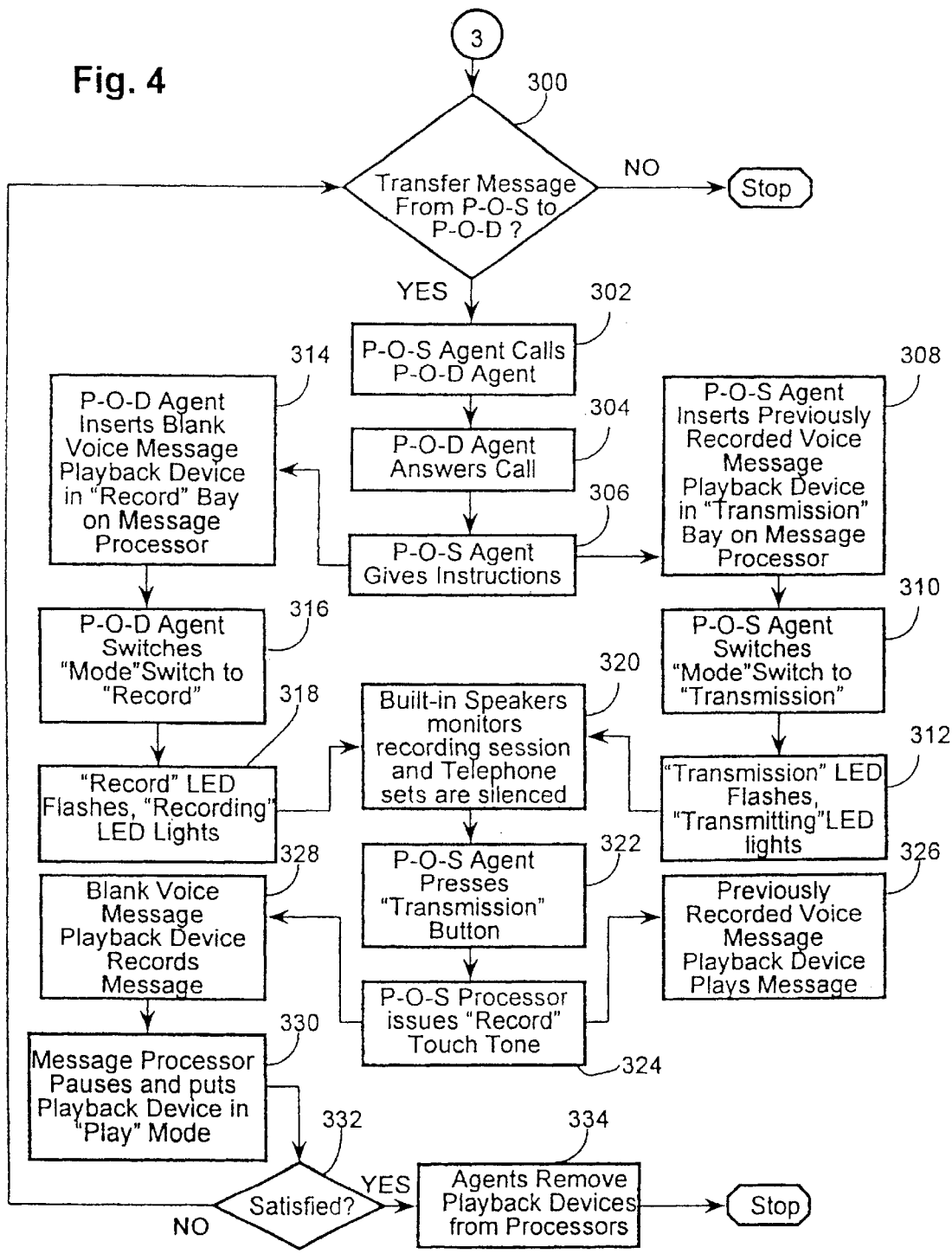

FIG. 4 is a flowchart illustrating the operation of message processor system 12 in accordance with the present invention when P-O-S desires to transmit a previously recorded voice message from a voice message recording/playback device 22 located at the P-O-S to a blank voice message recording/playback device 22 located at a remote point of delivery (P-O-D). The P-O-S agent determines a convenient time to transfer the message and contacts a P-O-D at block 300. At block 302 P-O-S agent dials a P-O-D agent on his/her telephone 18. P-O-D agent receives a call on his/her telephone 26 at block 304. At block 306 P-O-S agent gives P-O-D agent instructions including all associated delivery and billing information. P-O-S agent inserts previously recorded voice message recording/playback device 22 into 'Transmission' bay on message processor 12 at block 308. At block 310, P-O-S agent switches 'mode' switch on message processor 12 from 'Telephone' to 'Transmission'. At block 312, 'Transmission' LED flashes and 'Transmitting' LED lights.

At block 314, P-O-D agent inserts blank voice message recording/playback device 22 into 'Record' bay on message processor 12. At block 316, P-O-D agent switches 'mode' switch on message processor 12 from 'Telephone' to 'Record'. 'Record' LED flashes and 'Recording' LED lights on P-O-D message processor 12 at block 318. At block 320, speakers monitor recording session and telephone sets are temporarily disconnected on message processors 12 of both the P-O-S and P-O-D. At block 322, P-O-S agent presses 'Transmission' button on his/her message processor 12. Message processor 12 at P-O-S issues 'Record' touch-tone at block 324. Previously recorded message plays from voice message recording/playback device 22 at P-O-S at block 326. Blank voice message recording/playback device 22 located at the P-O-D records the message at block 328. At block 330, message processor 12 located at P-O-D pauses and puts the voice message recording/playback device 22 into the 'play' mode. At block 332, agents decide if they are satisfied with the recording. If not, they cause the process to return to block 300 to redo transfer sequence. If yes, the agents remove the voice message recording/playback devices 22 from their respective message processors at block 334 and the transfer is complete.

Figure 5:
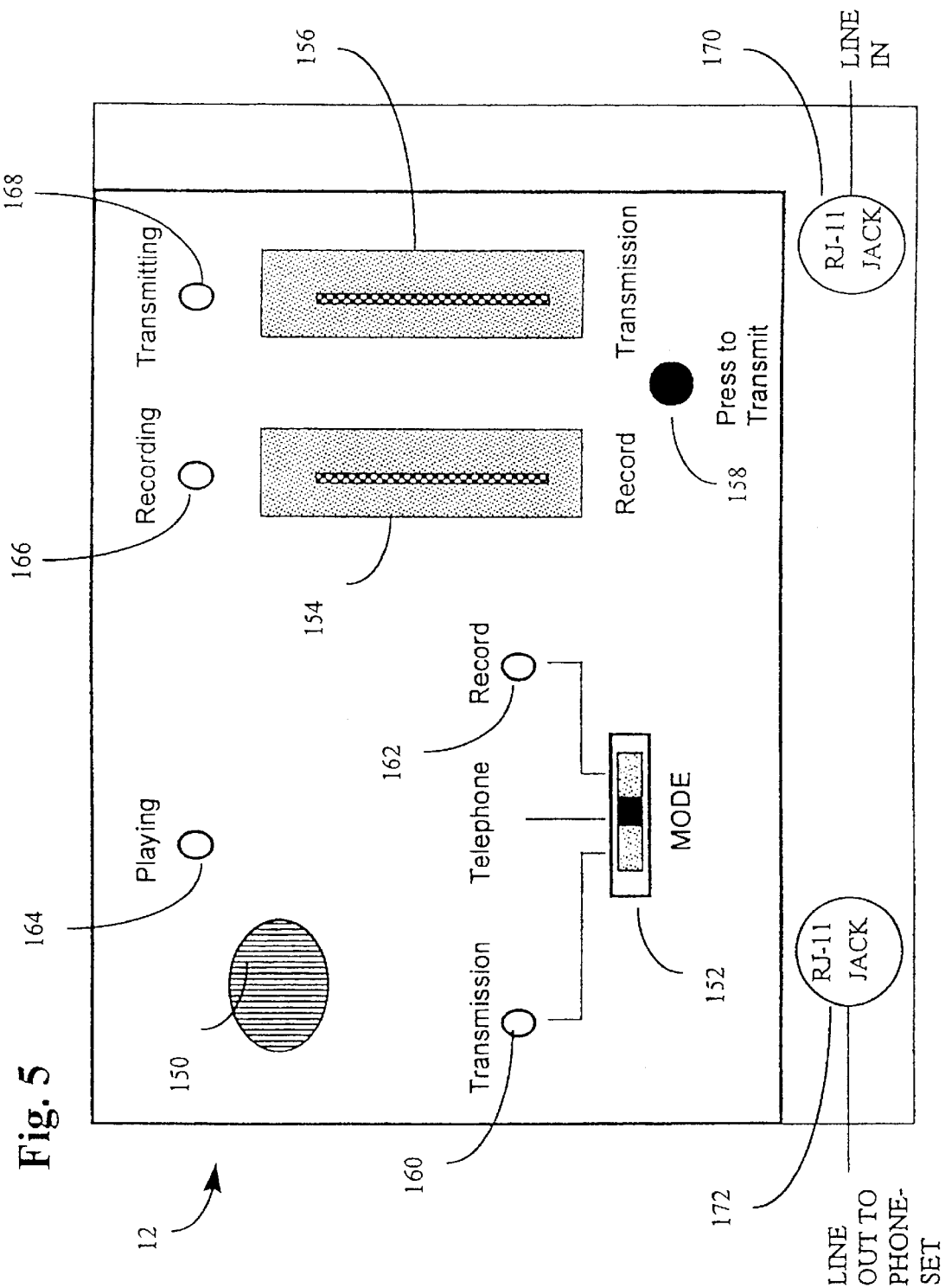
FIG. 5 is a schematic representation of a message processor in accordance with the preferred embodiment of the present invention.

FIG. 5 is a schematic representation of a point-to-point message processor 12 in accordance with the present invention. The message processor contains an RJ-11 telephone jack 170 via which it is connected to a line in from the telephone network and a second RJ-11 telephone jack 172 which is connected to a line out to a standard telephone set. The processor 12 also contains a special circuit board including receptacles for receiving voice message recording/playback devices and circuitry for operating the same to record and transfer a message thereon and therefrom. In addition, message processor 12 includes circuitry controlling and monitoring the cooperation of the telephone components and recording components as described in flowcharts contained in FIGS. 2 and 4.

Speaker 150 is used to monitor recording and transferring sequences. Mode switch 152 is used by P-O-S and P-O-D agents to control the functions of the message processor 12 at switch 820 on 12'. Record bay 154 and Transmission bay 156 contain male connector pins, which mate with female connectors on the voice message recording/playback device 22 and complete a circuit to record and transmit a recording respectively. Button 158 (which activates switch 860 on 12') is pressed by the P-O-S agent to put a voice message recording/playback device 22 inserted into the Transmission Bay 156 (corresponding to connector in bay 814 on 12') into 'Play' mode and simultaneously put a voice message recording/playback device 22 inserted into a Record bay 154 (corresponding to connector in bay 812 on 12') on a remotely located message processor 12 into 'Record' mode.

LED 160 (corresponding to LED 822 on 12') flashes when the mode switch 152 is switched to the 'Transmission' position. LED 162 corresponding to LED 818 on 12') flashes when the mode switch 152 is switched to the 'Record' position. 'Playing' LED 164 (corresponding to LED 828 on 12') stays lit when a voice message recording/playback device 22 inserted in the Record bay 154 is re-playing a message just recorded. 'Recording' LED 166 (corresponding to LED 824 on 12') stays lit when a voice message recording/playback device 22 inserted in the Record bay 154 is recording a message and 'Transmitting' LED 168 (corresponding to LED 826 on 12') stays lit when a voice message recording/playback device 22 inserted in the Transmission bay 156 is transmitting a message.

Figure 6:
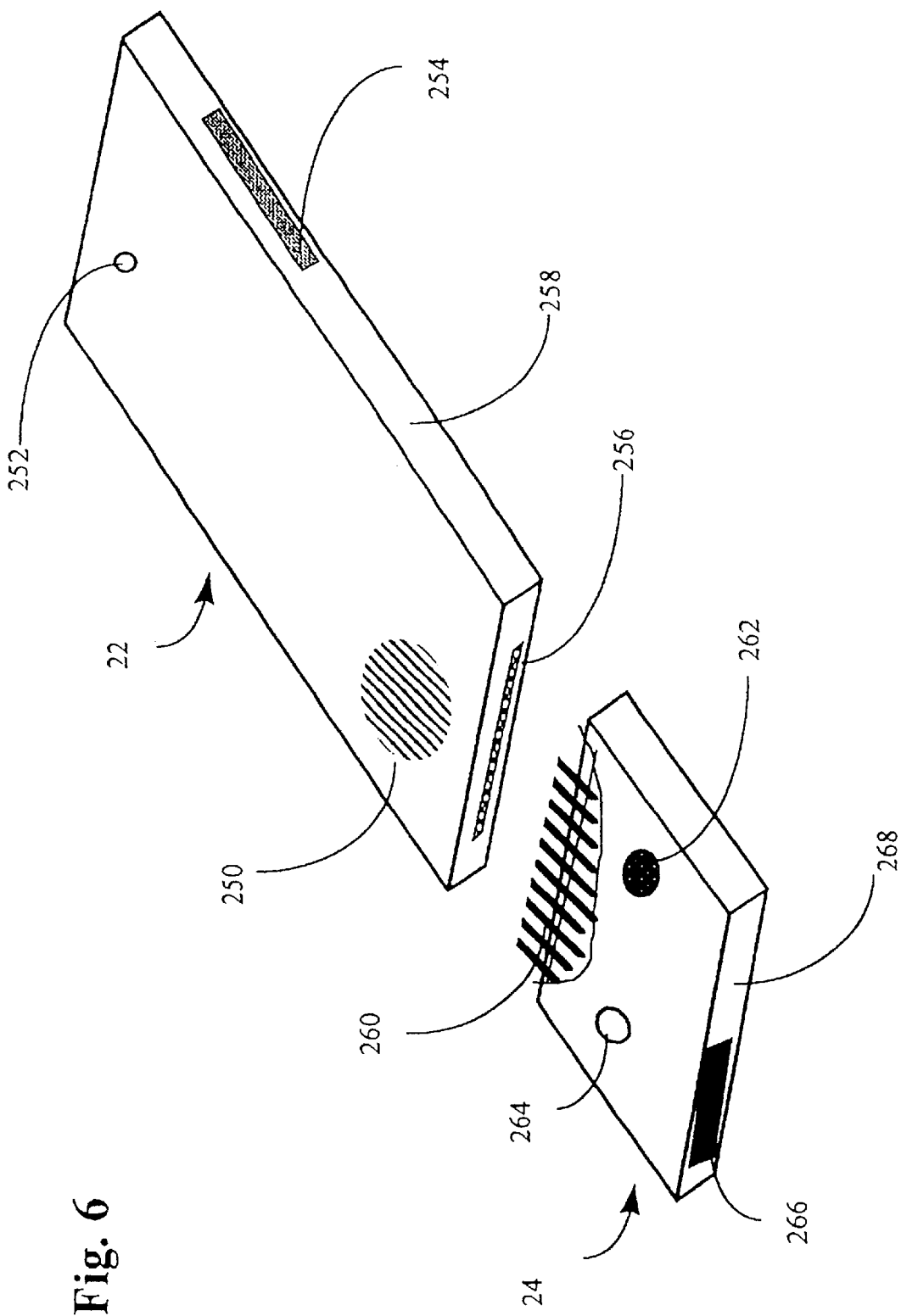
FIG. 6 is a perspective view, on an enlarged scale illustrating the presently preferred structure of a voice message recording/playback device and the presently preferred structure of a direct record input device in accordance with the present invention.

FIG. 6 is a perspective view of a preferred embodiment of a voice message recording/playback device 22 and a direct record input device 24 in accordance with the present invention. The voice message recording/playback device 22 is generally shaped like a card, approximately two inches wide and three inches long, and appropriately one-quarter inch high. It includes circuit board 22' described below and has a frame and protective cover preferably made of plastic and securely attached to the circuit board 22'. After a message has been transferred to the voice message recording/playback device 22, it may be inserted into a decorative sleeve preferably made of card stock. The plastic cover protects the circuits inside when the playback device is handled. A grid (or plurality of holes) 250 are provided in cover 258 above the location of the speaker 603 (reference to FIG. 7), to permit convenient listening to playback. In addition, a removable door 254 is provided in cover 258 to permit access to a battery 610 (reference to FIG. 7), for replacement. A pressure sensitive membrane 252 is provided in cover 258 over the location of switch 614 (reference to FIG. 7). By applying downward pressure on membrane 252, it can be deformed inwardly, depressing switch 614 (reference to FIG. 7).

As is conventional, circuit board 22' has a female connector 256 which is located on the edge of the board and has contacts to permit electrical connections to be made to the board. Message processor 12 and direct record input device 24 can then be conveniently provided with a male connector, which receives and engages the contacts on the female connector when the female connector on the edge of the board 22' is inserted.

The direct record input device 24 is generally shaped so as to compliment the card shape of the voice message recording/playback device 22, approximately one inch wide and two inches long, and appropriately one-quarter inch high. It includes a circuit board 24' described below and has a frame and protective cover preferably made of plastic and securely attached to the circuit board 24'. The plastic cover protects the circuits inside when the playback device is handled. A grid (or plurality of holes) 262 are provided in cover 268 above the location of the microphone 720 (reference to FIG. 8), to permit convenient recording of a voice message. A hole 266 is provided in cover 268 over the location of switch 710 (reference to FIG. 8) to permit it to be easily pressed. Another hole 264 is provided in cover 268 over the location of LED 718 (reference to FIG. 8) to permit it to be easily visible.

As is conventional, circuit board 24' has a male connector 260 which is located on the edge of the board and serves as contacts to permit electrical connections to be made to the board. Voice message recording/playback device 22 can then be conveniently provided with a female connector, which receives and engages the contacts on the male connector when the male connector on the edge of the board 24' is inserted.

Figure 7:
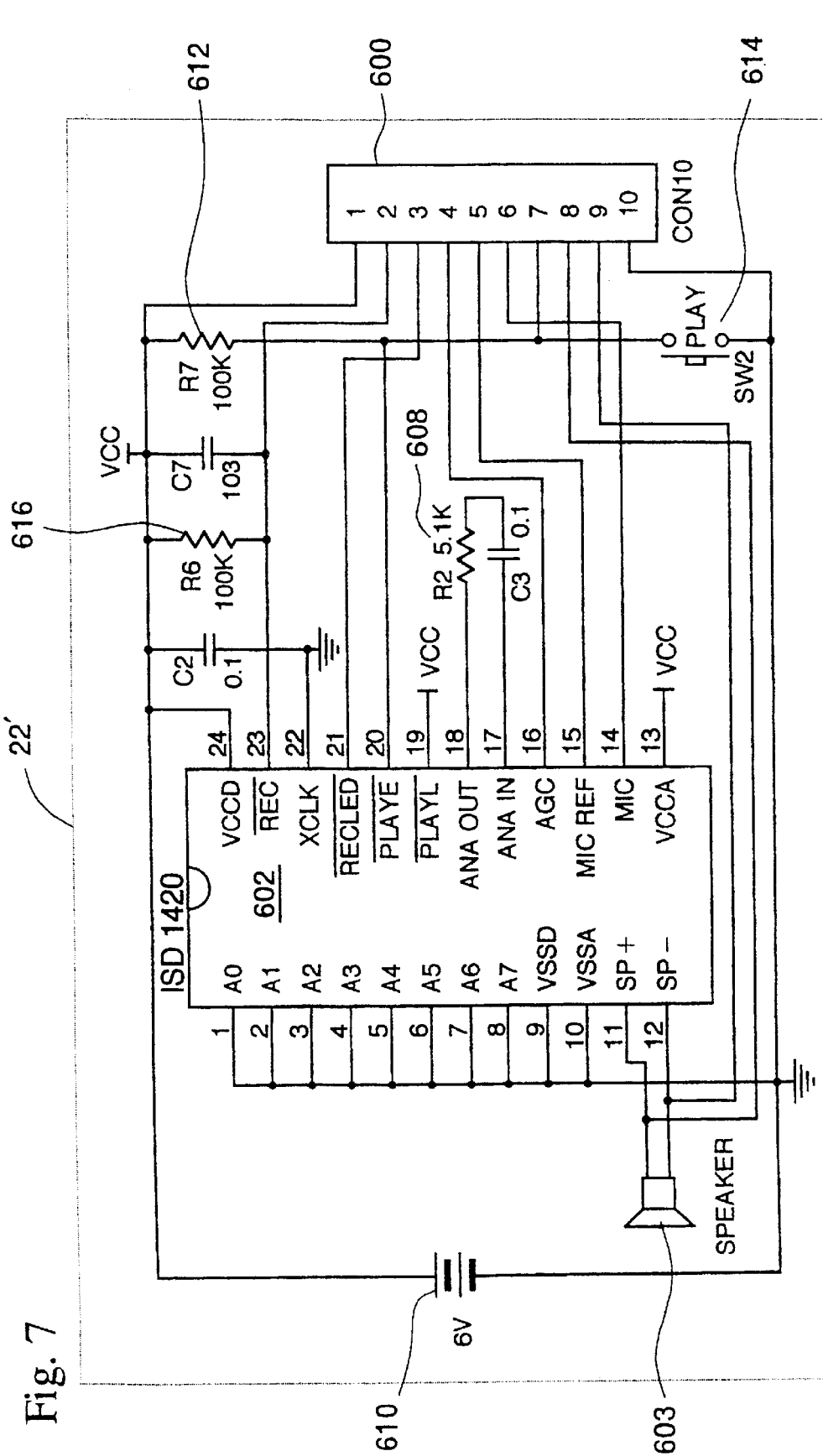
FIG. 7 is a schematic diagram of a preferred embodiment of a voice message recording/playback device in accordance with the present invention.

FIG. 7 is a simplified schematic diagram of a voice message recording/playback device 22 in accordance with the present invention. Preferably, the device will be fabricated as a hybrid circuit on a circuit board of less than 2×2 inches in size. The circuit board would be provided with an appropriate connector, for example, a 10 pin female connector, designed to fit in a male connector either on the message processor 12 or direct record input device 24.

At the heart of the playback device 22 is an integrated circuit 602, which is a single chip voice message system, preferably an ISD 1420 chip available from ISD (Information Storage Devices) Inc. of San Jose, Calif., U.S.A. This device is capable of direct storage of analog signals on the chip and playback at will under electronic control. Furthermore, storage is non-volatile, so a stored message is retained indefinitely, without the need for a power supply. Pins 1–8 are not used in this application and are returned to ground. Pin 9 and 10 are digital and analog inputs which are connected to a common ground.

All of the circuitry of playback device 22 is mounted on a circuit board 22' of conventional design. The circuit board also includes a conventional connector 600 (e.g. a female pin connector) and a mounting for a conventional disk-type battery (6 volts) 610. A miniature 16 ohm speaker 603, which is mounted on circuit board 22' is connected between terminals 11 and 12 and in parallel to terminals 8 and 9 of the connector 600. Pin 13 is the power input for the analog circuits in chip 602 and pin 24 is the power input for digital circuits in chip 602. Both pins 13 and 24 are connected to power supply circuitry 610 to be described below.

Pins 14 and 15 are designed to have a microphone connected between them. These pins are connected to terminals 5 and 6 respectively, of connector 600. Pin 16 is provided for the external connection of components to control the characteristics of automatic gain control, which is used during recording (AGC). This pin is connected to terminal 4 of connector 600 and when playback device 22 is plugged into message processor unit 12 or into the direct record input device 24, a capacitor and resistor 808 on the message processor unit 12 or a capacitor and resistor 708 on the direct record input device 24 are connected in parallel between pin 16 and ground. The values of the capacitor and resistor are selected in accordance with the chip manufacturer's specifications in order to achieve specific, desired AGC characteristics. This avoids the need to supply these components on each chip. A capacitor and resistor 608 are connected in serial between pins 17 and 18 in accordance with the manufacturer's specifications for proper operation of the circuitry.

Pin 19 is a playback level activation signal of the chip 602 which is connected to VCC voltage 610. Pin 20 is a playback edge activated signal in the chip 602. When a low-going transition is detected on this input signal, a playback cycle begins. Pin 20 is connected to pull up resistor 612 and to VCC 610 and is also connected to the internal play switch 614 and also terminal 7 on connector 600 for playback from message processor 12. When switch 614 is closed, pin 20 (PLAYE; Playback Edge-Activated) is connected to ground and this initiates a playback cycle from the beginning of the message space. An alternative method to initiate playback is to close play circuit from external connector 600.

Pin 23 is the record signal. The device records whenever this signal input is low. A record cycle is completed when the input is pulled high or the memory space is filled. Pin 23 is connected to VCC 610 by resistor and capacitor 616. Pin 23 is also connected to terminal 2 on connector 600 which is connected to a record switch 710 on the direct record input device 24 or switch 810 on message processor 12.

Pin 21 is Rec LED out. The output on this pin is low during a record cycle. This pin is used to drive an LED to provide feedback that a record cycle is in progress. The output returns to a high state when record pin 23 is released high or when the recording is completed due to the message space being filled. Pin 21 is connected to terminal 3 on connector 600 which is connected to LED 718 on the direct record input device 24 or LED 824 on message processor 12.

Pin 22 which is the external clock input of the device is not used and is therefore connected to ground.

Figure 8:
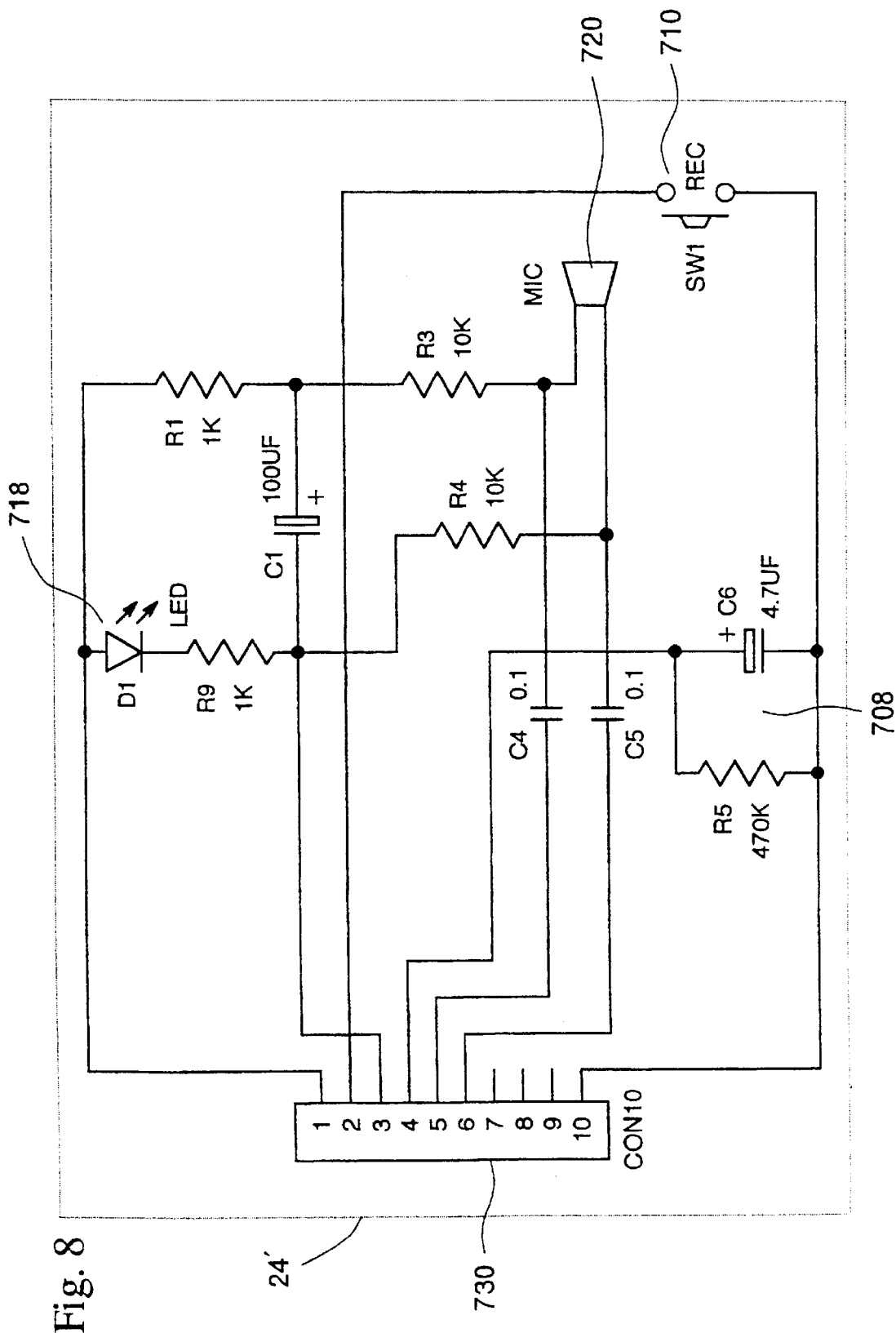
FIG. 8 is a schematic diagram of a preferred embodiment of a direct record input device in accordance with the present invention.
Figure 9A:
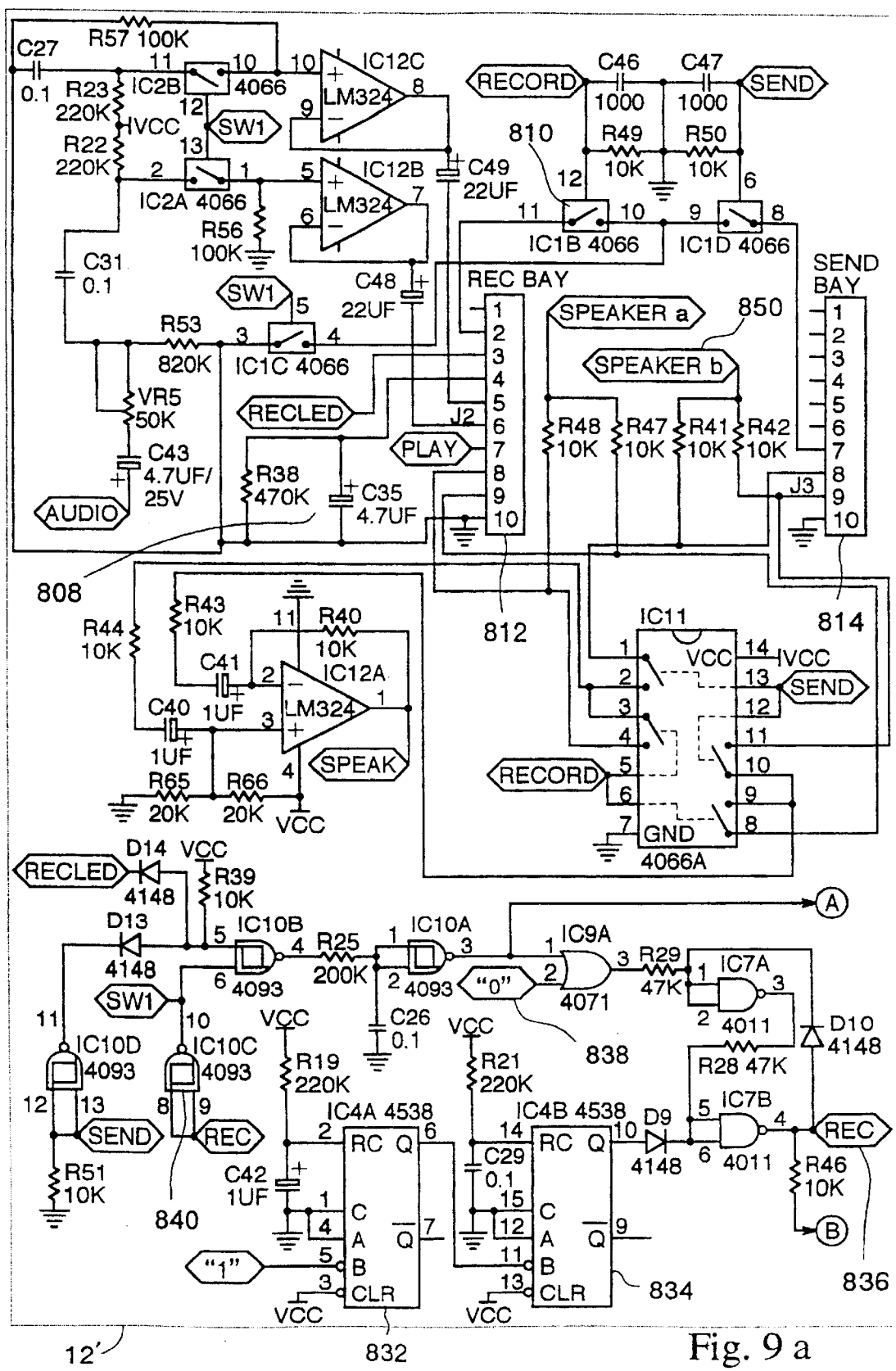
FIG. 9 (FIG. 9 comprises FIGS. 9a, 9b, 9c and 9d) is a schematic diagram of a preferred embodiment of a point-to-point message processor in accordance with the present invention.
Figure 9:
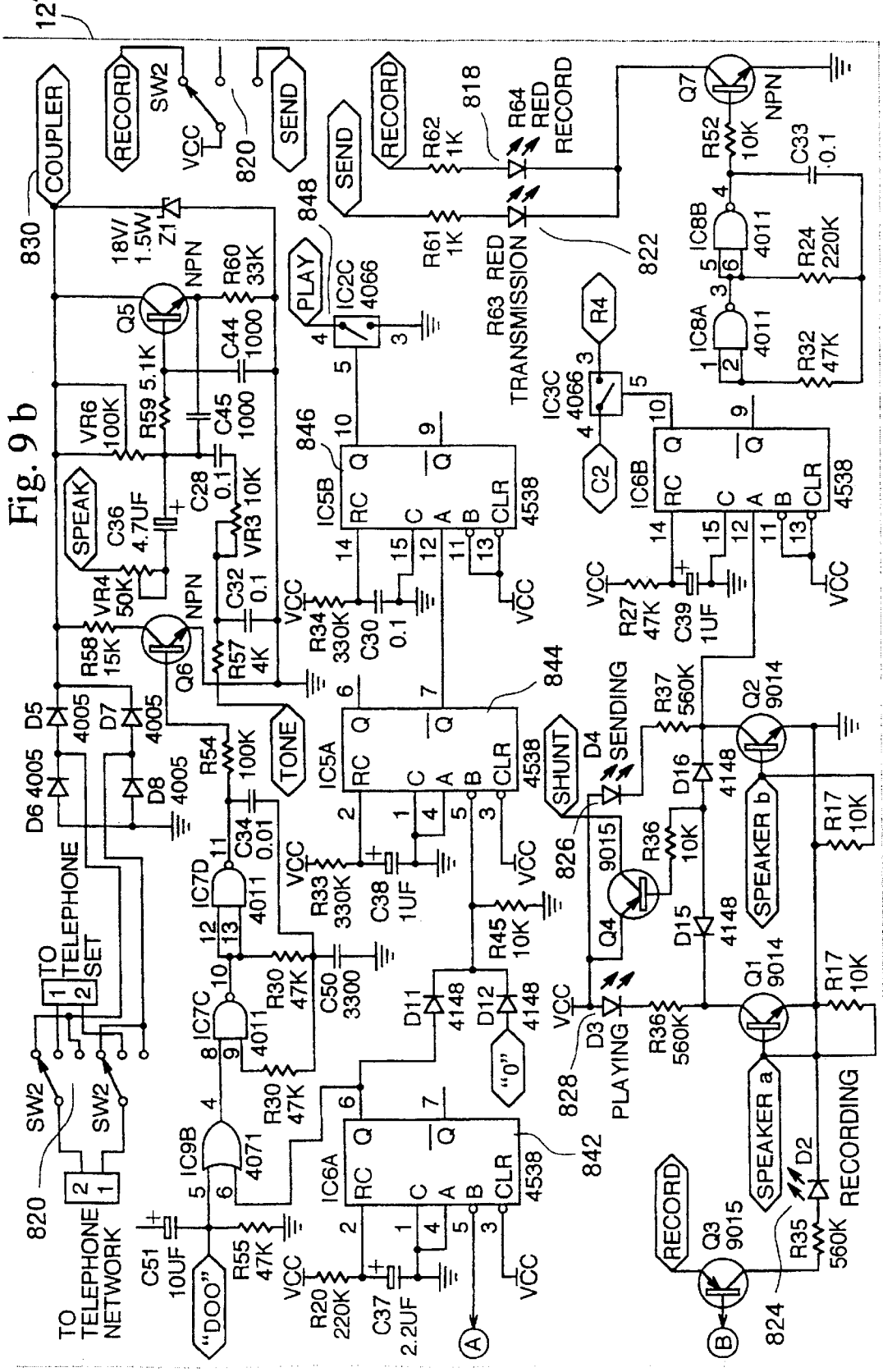
Figure 9C:
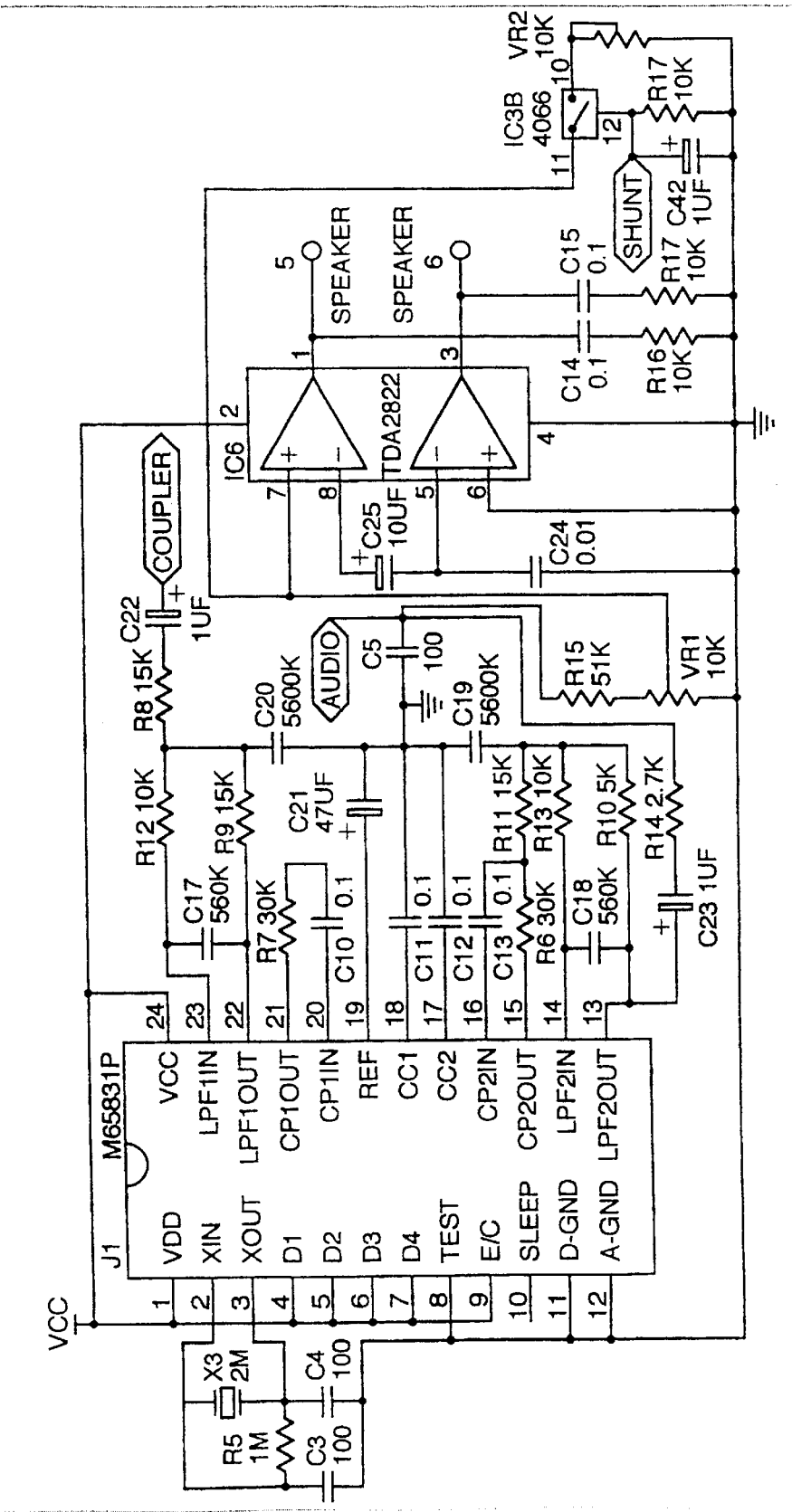
Figure 9D:
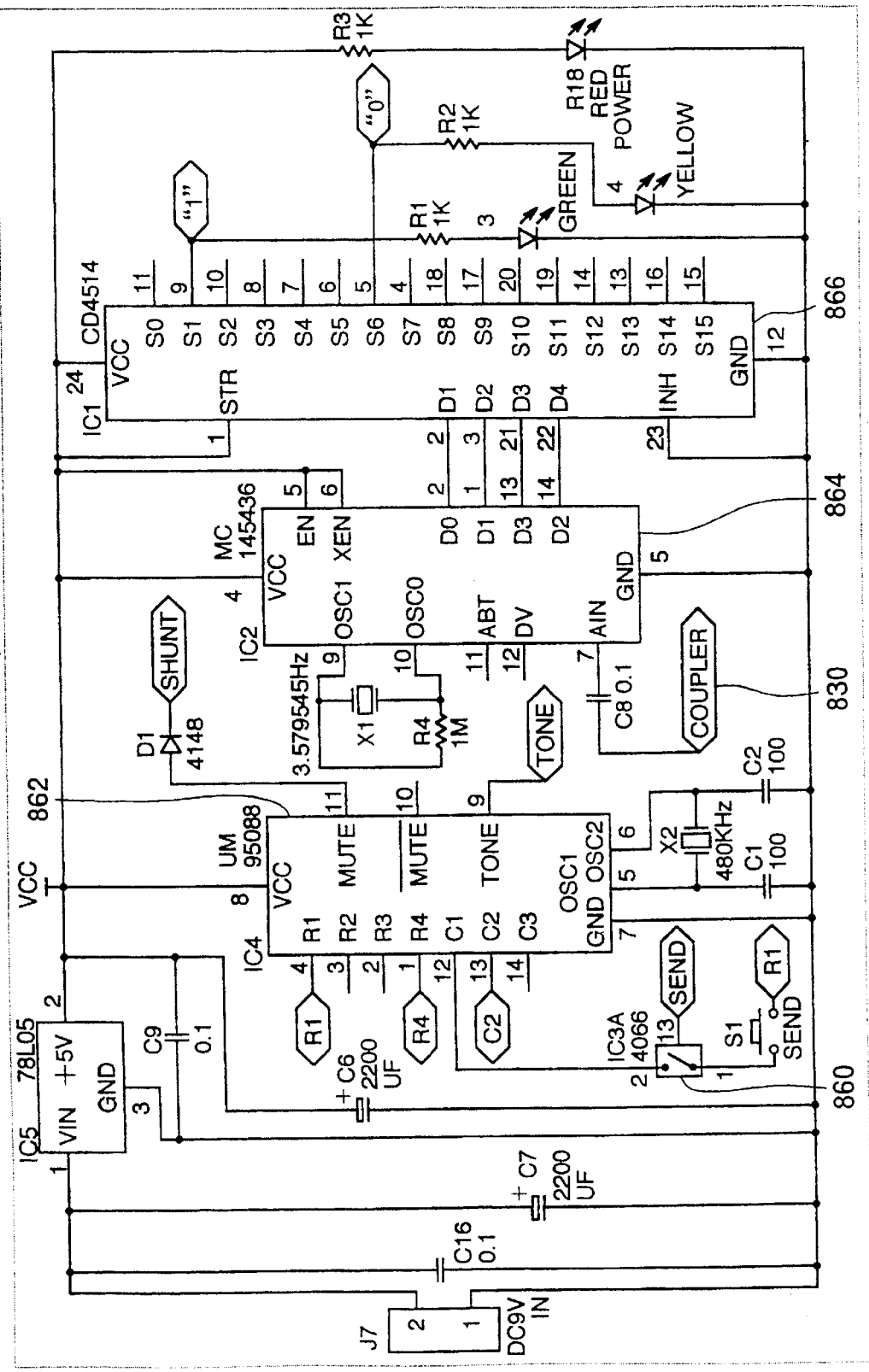

FIG. 8 is a simplified schematic diagram of a direct record input device 24 in accordance with the present invention.

Preferably, the device will be fabricated on a circuit board 24' of less than 1×2 inches in size. The circuit board would be provided with an approximate connector 730, for example, a 10 pin male connector, designed to fit in a female connector 600 on the voice message recording/playback device 22' (in FIG. 7). LED 718 shows that the record cycle has been activated and connects to terminal 3 on connector 600 which connects to Pin 21 on chip 602. Record switch 710 connects to terminal 2 on connector 600 which connects to Pin 23 on chip 602 and initiates a record cycle as described above. Capacitor and resistor 708 connect to terminal 4 of connector 600 in parallel between pin 16 and ground. The values of the capacitor and resistor are selected in accordance with the chip manufacturer's specifications in order to achieve specific, desired AGC characteristics.

FIGS. 9a, 9b, 9c and 9d constitute a schematic diagram of a preferred embodiment of the message processor 12. When voice message recording/playback device 22 is plugged into message processor 12, the message processor can control whether the playback device is recording or playing back by controlling the level of the signal on terminal 2 and 7 respectively of connector 600 as described above. When message processor 12 causes playback device 22 to record a message, the desired message, as received from the message processor 12, is supplied between pins 5 and 6 of connector 600. This causes the voice information to be applied between pins 14 and 15 of chip 602 which are the microphone input pins.

When mode switch 820 is in 'Telephone' mode, the telephone circuit is closed and internal speaker 850 is open. When mode switch 820 is switched to either 'record' or 'Transmit' (send), the telephone circuit is open and internal speaker 850 is closed. LED 818 is a record LED corresponding to LED opening 162 in FIG. 5. LED 822 is transmitting (send) LED corresponding to LED opening 160 in FIG. 5. LED 824 is the recording LED corresponding to LED opening 166 in FIG. 5. LED 826 is the Transmitting (send) LED corresponding to LED 168 opening in FIG. 5. LED 828 is the playing LED corresponding to LED opening 164 in FIG. 5. Switch 860 corresponds to 'Transmit' switch opening in FIG. 5 and when pressed closes a circuit to UM95088, which is a DTMF Tone generator chip (indicated as 862) and which transmits over telephone line circuit 830.

When a DTMF (Dual Tone Multi-Frequency) tone (e.g. Pushbutton '1' 697 Hz and 1209 Hz Frequency) is pressed by customer it is detected by the MC145436 DTMF decoder chip 864 and CD4514 4-TO-16 Line Decoder (multiplexer) chip 866, which identifies the DTMF tone and sends a high voltage to pin 9 of chip 866. This lights a green LED and triggers flip flop circuits 832 and 834, to activate 'record' terminal 3 on REC bay 812 which corresponds to Record Bay cut-out 154 in FIG. 5. This also activates 'Play' terminal 7 on Transmission (send) Bay which corresponds to Transmission Bay cutout 156 in FIG. 5.

During recording, signal 836 is always high. When recording is finished, either by chip 602 reaching its maximum capacity or when a DTMF tone (e.g. Pushbutton '0' 941 Hz and 1336 Hz Frequency) 838 is pressed by customer, signal 836 triggers rec while going low and the output of NAND 840 goes high. As a result the input to flip flop 842 goes high. The output of this device goes to flip flops 844 and 846 which send a 'Play' signal via switch 848 to terminal 7 on 'record' bay 812.

Figure 10:
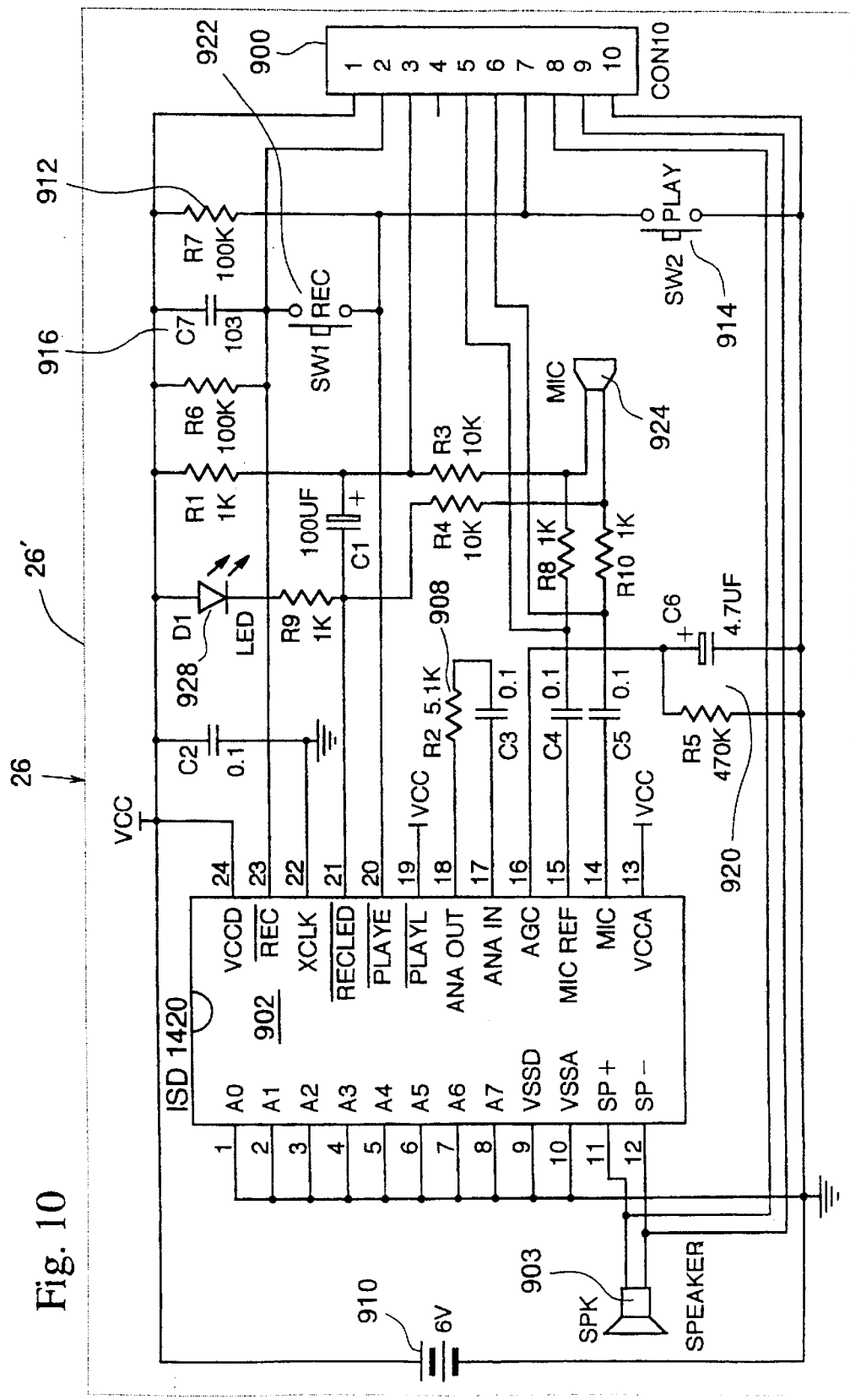
FIG. 10 is a schematic diagram of another preferred embodiment of a voice message recording/playback device in accordance with the present invention.

A playback device 26 of another preferred embodiment of the present invention is shown in FIG. 10 in a simplified schematic diagram.

Preferably, the message recording/playback device 26 will be fabricated as a hybrid circuit on a circuit board 26'. The circuit board 26' would be provided with a connector 900 such as a 10 pin female connector which is suitably designed to receive a male connector on the message processor 12.

At the heart of the playback device 26, there is an integrated circuit 902 which is a single chip voice message system, preferably an ISD 1420 chip available from ISD Inc. of San Jose, Calif.

Pins 1 to 8 are not used in this application and are returned to ground. Pins 9 and 10 represent digital and analog inputs which are connected to ground.

All of the circuit components of the playback device 26 are mounted on the circuit board 26'. The circuit board 26' includes a conventional connector 900 (e.g. a female pin connector) and a mount for a conventional disk-type battery 910. A miniature 16 ohm speaker 903 is mounted on the circuit board 26' and is connected between terminals 11 and 12 and in parallel to terminals 8 and 9 of the connector 900. Pin 13 is the power input for the analog circuits in chip 902, and pin 24 is the power input for the digital circuits in chip 902. Both pins 13 and 24 are connected to power supply circuitry 910.

Microphone 924 is connected between pins 14 and 15. These pins 14 and 15 are connected to terminals 5 and 6, respectively, of the connector 900. Capacitor and resistor 920 is connected between pin 16 and ground. The values of the capacitor and resistor are selected in accordance with the chip manufacturer's specifications in order to achieve specific, desired AGC (Automatic Gain Control) characteristics. Capacitor and resistor 908 is connected in serial between pins 17 and 18 in accordance with the manufacturer's specifications for proper operation of the circuitry.

Pin 19 is a playback level activation signal of the chip 902 which is connected to VCC 910. Pin 20 is the playback signal. When a low-going transition is detected on this input signal, the playback cycle begins. Pin 20 is connected to VCC 910 via a pull up resistor 912 and to ground via a play switch 914 and also to terminal 7 of the connector 900 for playback from message processor 12. When playback switch 914 is closed, pin 20 PLAY is connected to ground and this initiates the playback cycle from the beginning of the message space. An alternative method to initiate playback is to close play circuit from the external connector 900.

Pin 23 is the record signal. Whenever this input signal is low, the record cycle begins. The record cycle is completed when the input is pulled high or the memory space is filled. Pin 23 is connected to VCC 910 via resistor and capacitor 916 and to terminal 2 of the connector 900 which is connected to switch 810 on the message processor 12. Record switch 922 and play switch 914 are connected in serial between the pin 23 and ground. The chip 902 is designed such that REC 23 signal takes precedence over PLAY 20 signal. Therefore, when both the switches 914 and 922 are closed, the record cycle begins. Of course, the record switch 922 may be connected between the pin 23 and ground. In this case, whenever the switch 922 is closed, the record cycle begins.

LED 928 is connected between the VCC 910 and REC LED pin 21. The output on this pin 21 is low during the record cycle. Therefore, the LED 928 shows that the record cycle has been activated. The output returns to a high state when the record pin 23 is released high or when the recording is completed due to the message space being filled.

Pin 22 which is the external clock input of the device is not used and is therefore connected to ground.

Although preferred embodiments of the invention have been disclosed for illustrative purposes, those skilled in the art will appreciate that many additions, modifications and substitutions are possible, without departing from the scope and spirit of the invention as defined by the accompanying claims.

What is claimed is:

1. A voice message processor comprising, in a single, co-located, unit:
   a connection for a communication link capable of transmitting and receiving cells over a public communication network;
   a connection for a telephone set;
   a connection for a recordable voice message recording/playback device having an input for a signal representing a voice message to be recorded and an output for a signal representing a previously recorded voice message to be played back;
   a switching device providing:
      a first state in which the telephone set connection and communication link connection are connected together,
      a second state in which the voice message recording/playback device input is connected to the communication link connection, and
      a third state in which voice message recording/playback device output is connected to the communication link connection; and
   a controller controlling said voice message recording/playback device to be selectively recorded and played back when said switching device is in its second state and controlling said voice message recording/playback device to be selectively played back when said switching device is in its third state.

2. A voice message processor in accordance with claim 1 wherein said connection for said recordable voice message recording/playback device comprises a record bay which receives a voice message recording/playback device on which a message from the communication link is to be recorded and a transmission bay which receives a voice message recording/playback device from which a previously recorded message is to be played over the communication link for remote recording.

3. A voice message processor in accordance with claim 1 or 2 wherein the telephone set connection and communication link connection are disconnected from each other during at least one of the second and third states.

4. A voice message processor in accordance with claim 1 or 2, wherein the switching device comprises a manually operable switch.

5. A voice message processor in accordance with claim 1 or 2 further comprising a speaker for audible reproduction of a previously recorded voice message being played back by said voice message recording/playback device.

6. A voice message processor in accordance with claim 1 or 2 further comprising visual indicators actuated when at least one of the following occurs: recording of a voice message in said voice message recording/playback device, playing of a previously recorded voice message by said voice message recording/playback device, a previously recorded message from a voice message recording/playback device is to be played over the communication link.

7. A voice message processor in accordance with claim 1 or 2, wherein said controller enables said voice message recording/playback device in response to a signal received via said connection for a communication link.

8. A voice message processor in accordance with claim 1 or 2 in combination with direct record input device, which is connectable to said voice message recording/playback device to permit an individual to record a voice message directly therein.

9. A method for utilizing a voice message processor in accordance with claim 1 to make a local recording of a voice message from a remote location, comprising the steps of:

establishing a telephone connection with the remote location via a communication link connected to said connection for a communication link;

connecting a recordable voice message recording/playback device to said connection for a recordable voice message recording/playback device; and placing the switching device in its second state, whereby the controller enables local recording of a message received over the communication link.

10. The method of claim 9 wherein the voice message at the remote location is produced by the voice message processor playing back a previously recorded voice message recording/playback device.

11. The method of either of claim 9 or 10 wherein the recording step is performed in response to signals received from the remote location over the communication link.

12. A method for utilizing a voice message processor in accordance with claim 1 to make a recording at a remote location of a local voice message, comprising the steps of:

establishing a telephone connection with a remote location at which the voice message processor is located, via a communication link connected to said connection for a communication link;

arranging to have a recordable voice message recording/playback device connected to said connection for a recordable voice message recording/playback device;

arranging to have the switching device in placed its second state; and transmitting a locally generated voice message over the communication link, the controller enabling remote recording of the locally generated message.

13. The method of claim 12 wherein the local voice message is produced by the voice message processor playing back a previously recorded voice message recording/playback device.

14. The method of claim 12 wherein the local voice message is produced by the combination of the voice message processor and a remote voice message recording/playback device previously recorded at the remote location by means of the direct record input device, while connected to said remote voice message recording/playback device by playing back the voice message recording/playback device.

15. The method of any of claims 12–14 wherein said transmitting step is performed in response to a signal received from the remote location over the communication link.

16. A voice message recording/playback device, comprising:

a connector constructed to connect to the connection for a recordable voice message recording/playback device in a voice message processor as in claim 1 and a direct record input device;

a playback switch for generating a playback signal;

a speaker for audible reproduction of a recorded voice message; and a control device for playing back said recorded message from said speaker in response to said playback signal transmitted from said playback switch or from said voice message processor via said connector.

17. A direct record input device adapted to be used in combination with a voice message recording/playback device in accordance with claim 16, comprising:

a connector for connecting to said voice message recording/playback device;

a microphone for inputting a voice message; and a record switch for generating a record signal.

18. A direct record input device in accordance with claim 17 further comprising an indicator for showing a record cycle being activated.

19. A voice message recording/playback device for recording a voice message and for providing an audible reproduction of a recorded voice message, comprising:

a connector constructed to connect to the connection for a recordable voice message recording/playback device in a voice message processor as in claim 1 and;

a playback switch for generating a playback signal;

a speaker for audible reproduction of the recorded voice message;

a record switch for generating a record signal;

a microphone for inputting said voice message; and a control device for recording said voice message from said microphone in response to said record signal transmitted from said record switch and for playing back said recorded message from said speaker in response to said playback signal transmitted from said playback switch.

\* \* \* \* \*